April 28, 1970     R. G. DONLEY, JR     3,509,510
POTENTIOMETERS
Filed Jan. 8, 1968
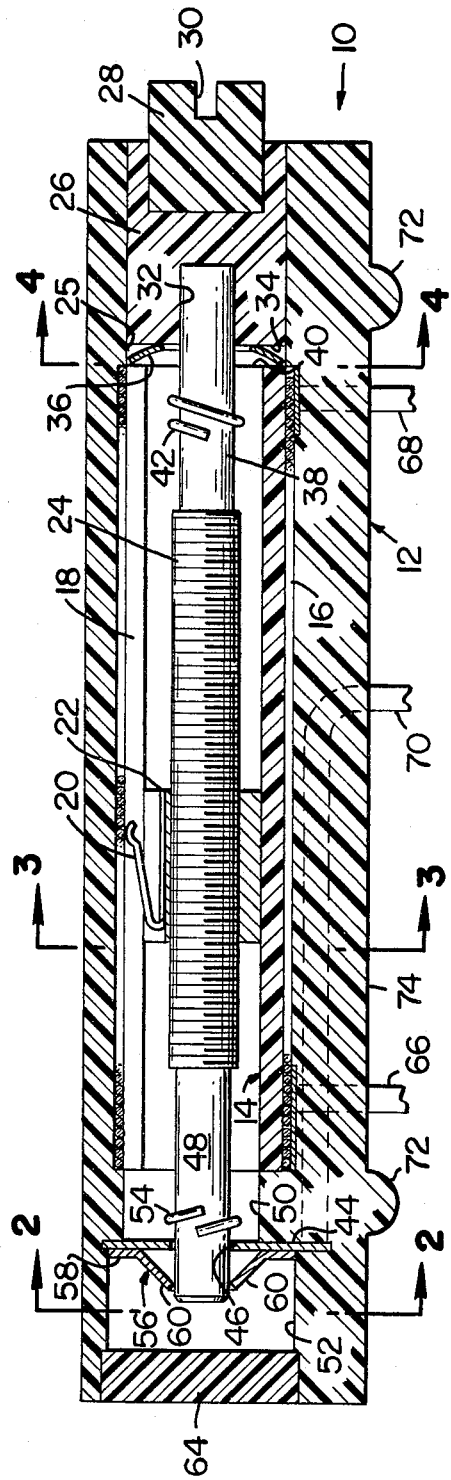
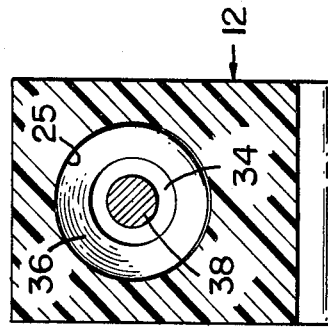
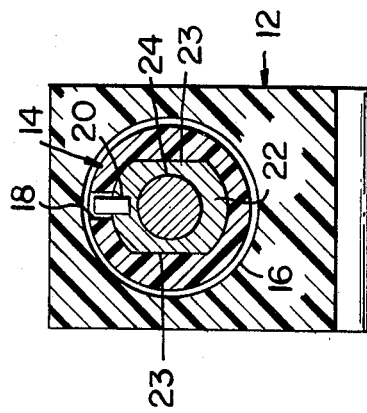
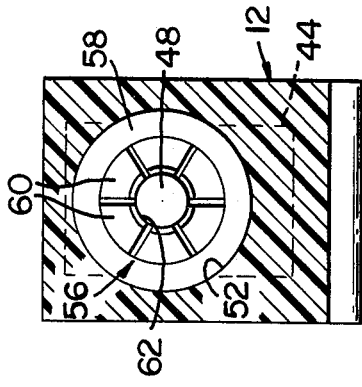
INVENTOR.
RAYMOND G. DONLEY, JR.
BY
Townsend and Townsend
ATTORNEYS

United States Patent Office

3,509,510
Patented Apr. 28, 1970

3,509,510
POTENTIOMETERS
Raymond G. Donley, Jr., Mountain View, Calif., assignor, by mesne assignments, to Nutron Electronics Company, Mountain View, Calif., a corporation of California
Filed Jan. 8, 1968, Ser. No. 696,203
Int. Cl. H01c 5/02
U.S. Cl. 338—180                                   5 Claims

ABSTRACT OF THE DISCLOSURE

A potentiometer having a tubular core within an open end tubular housing and provided with a rotatable screw within the core and carrying a wiper which engages electrical resistance means on the core. The screw is inserted into the core through one end of the housing and is rotatably supported at its ends by a pair of bearing members, one of which is rotatable relative to the housing and carried at said one end thereof. The other bearing member is coupled to the screw after it is in place within the core and prevents the screw from being removed from the core through said one end of the housing. The housing is formed from a moldable material and is molded into the core.

---

This invention relates to improvements in potentiometers and, more particularly, to an improved trimmer potentiometer.

The present invention is directed to improvements in potentiometers of the above-mentioned type wherein a tubular core having resistance means disposed thereon is positioned within a housing and surrounds a rotatable screw carrying a wiper which moves along and through a longitudinal slot in the core and in engagement with portions of the resistance means extending across the slot. The screw is coupled to the core and housing in a manner to allow for simplified construction of the core and housing and to permit the components to be quickly and easily assembled while the unit cost of the potentiometers is kept at a minimum.

Prior potentiometers of this type are complex in construction, require considerable time and effort in assembly and have a relatively high unit cost. The complexity of the prior structures is due primarily to the way in which the rotatable screw is mounted to allow for rotation within the core. Since the components of trimmer potentiometers are quite small in size it is oftentimes difficult to obtain the proper fit between the various components while still allowing for proper engagement of the wiper on the resistance means extending across the longitudinal slot. Even if a proper fit is achieved, it can only be done with a relatively large number of parts which must be precisely machined and with certain of the parts having irregular configurations the large number of parts adds to the cost of each unit and increases the probability of malfunction. Irregular configurations of some of the parts increases production costs and makes the assembly of the parts more tedious and time-consuming.

The present invention avoids the problems inherent with the use of prior structures by providing a potentiometer which is simple and rugged in construction, has a relatively small number of parts, and is capable of being miniaturized so that it can be used as a trimmer potentiometer. To this end, the potentiometer uses a special type of mounting structure for the ends of the central screw whereby the screw can be rotated in opposite directions while electrical contact can be maintained with the screw itself. Moreover, the mounting structure for the screw permits the components of the potentiometer to be inexpensively made inasmuch as such construction does not require complex and costly dies or other equipment. The potentiometer of this invention achieves the above aims through the provision of the specific bearing means at each end of the screw, particularly the bearing means at one end of the screw which not only journals the latter but also prevents it from being removed from the opposite end of the core, the end through which the screw passes during assembly. This feature therefore precludes having to make the housing with a complex inner surface and avoids having to insert all of the inner working components through one end of the potentiometer. Thus, certain of the components can be inserted in one end while other components can be inserted in the opposite end. This feature speeds up the assembly time and minimizes production cost.

The primary object of this invention is to provide a potentiometer of the type having rotatable screw within a tubular core provided with resistance means wherein the screw is electrically coupled to the resistance means and is provided with an improved bearing means at each end to permit the parts of the potentiometer to be greatly simplified over that of conventional potentiometers of this type, while assembly time of the parts is kept to a minimum to thereby reduce the over-all unit cost of the potentiometer.

Another object of this invention is to provide a potentiometer of the type described wherein the core is disposed within a protective housing which is made to permit certain of the parts to be inserted within one end of the housing while other parts can be inserted in the opposite end of the housing to thereby simplify the assembly of the potentiometer as well as to simplify the configurations of the various parts.

Another object of this invention will become apparent as the following specification progresses, reference being had to the accompanying drawing for an illustration of a preferred embodiment of the potentiometer.

In the drawings:
FIG. 1 is a longitudinal section through the potentiometer of this invention;
FIG. 2 is a cross-sectional view taken along line 2—2 of FIG. 1;
FIG. 3 is a cross-sectional view taken along line 3—3 of FIG. 1; and
FIG. 4 is a cross-sectional view taken along line 4—4 of FIG. 1.

Potentiometer 10 includes an outer body or tubular open end housing 12 having any desired outer configuration. For purposes of illustration only housing 12 has rectangular sides and ends with the outer faces substantially flat.

Housing 12 surrounds an open end core 14 having resistance means thereon in the form of a coil 16 of resistance wire wound on the outer surface of the core. The core has a longitudinal slot 18 formed therein extending the entire length thereof. Portions of coil 16 bridge the gap formed by slot 18 so that a wiper 20 extending into the slot and carried by a slider 22, will advance longitudinally of the slot as the slider moves along a rotatable lead screw 24 on which slider 22 is threadably mounted. The wiper will make electrical contact with the bridging portions of the coil and the slider and screw will be of electrically conductive material so that the wiper 20 may be electrically connected by an external lead to a circuit component exteriorly of housing 12. Core 14 has a pair of inner, opposed, longitudinal extensions 23 integral therewith and provided with flat, inner sides disposed for sliding engagement with the opposed flat sides of slider 22 (FIG. 3).

Housing 12 may be formed from any suitable material but preferably it is of a material capable of being molded so that it may be molded onto core 14 after coil 16 has been wound thereon. For purposes of illustration only, alkyd has been found to be suitable for this purpose in that it is easily handled and is capable of readily setting to a hardened condition.

Housing 12 has an inner, cylindrical surface 25 at one end thereof for rotatably receiving a cylindrical bearing member 26 of insulating material. Bearing member 26 is thereby journaled in housing 12 for rotation axially thereof. A head 28 having a notch 30 therein is rigidly secured to bearing member 26 for rotating the same when a tool is inserted into notch 30.

One end of lead screw 24 has a shank 38 whose outer end is rigidly coupled to bearing member 26, such as being molded into a bore 32 formed in the inner end face 34 of bearing member 26. Thus, shank 38 and thereby screw 24 will rotate with bearing member 26.

A washer-like spring 36 is received upon shank 38 and normally bears against the end face 40 of core 14 and end face 34 of bearing member 26. Spring 36, when potentiometer 10 is completely assembled, biases lead screw 24 to the right when viewing FIG. 1. A coil spring 42 having approximately 1¼ to 1½ loops surrounds shank 38 and is used to reverse the movement of slider 22 when the slider is at one end of screw 24 and the direction of rotation of the screw is reversed.

An end plate 44 is rigidly connected in any suitable manner to housing 12 adjacent to the opposite end thereof. Plate 44 has a central aperture 46 therethrough for rotatably receiving and supporting the opposite shank 48 of lead screw 24. Also, plate 44 is at the junction of a first inner surface 50 of housing 12 and a second inner cylindrical surface 52 of greater diameter than surface 50 and in end-to-end relationship thereto. A coil spring 54 surrounds shank 48 and is used for the same purpose as spring 42.

A retainer element 56 is mounted on the end of shank 48 for rotation therewith relative to plate 44. Element 56 prevents shank 48 from moving to the right as viewed in FIG. 1 and is comprised of an annular base 58 which slidably engages plate 44 and a number of radially extending arms 60 integral with base 58 and having arcuate shank-engaging edges 62 (FIG. 2) for frictionally engaging respective circumferential portions of shank 48 in a manner to hold the shank against movement relative to plate 44 and to the right when viewing FIG. 1. To this end arms 60 are sprung outwardly from shank 48 when the latter is engaged by the arms. To provide for this, element 56 is initially disposed so that the central opening defined by the arcuate edges 62 of arms 60 is of a smaller diameter than the outer diameter of shank 48. In this way, edges 62 will "bite" into shank 48 and the arms 60 are oriented so that they will effectively prevent movement of screw 24 toward the opposite end of housing 12 corresponding to bearing member 26 under the biasing action of spring 36. Plate 44 and element 56 define a second bearing member which journals the proximal end of screw 24 and holds the latter against movement toward the opposite bearing member.

A plug 64 is used to close housing 12 after bearing element 56 has been inserted in place on shank 48. This plug therefore keeps dirt and dust out of housing 12 and core 14 to thereby assure reliable operation at all times. A pair of leads 66 and 68 are rigidly secured to the ends of coil 16 in any suitable manner before housing 12 is mounted on the core. Also, a third lead 70 is rigidly secured to plate 44, the latter being of a suitable electrically conductive material as is element 56 whereby an electrical path will be established from lead 70 through plate 44, element 56, screw 24, slider 22, wiper 20, and the portions of the coil 16 which bridge the gap defined by slot 18.

In assembling potentiometer 10, core 14 is first made with slot 18 therein, following which coil 16 is wound on the outer surface of the core and leads 66 and 68 are attached to the ends of the coil. Then, the core is put into a jig or other suitable support with end plate 44 spaced the proper distance away from the core as shown in FIG. 1. Lead 70 will have been rigidly attached to end plate 44 so that housing 12 can then be molded over the core if a molded housing is used.

Assuming that the housing is molded, the molding operation is then conducted by directing the core with the resistance means thereon into a suitable mold and causing the molding material to flow about the core and into the configuration shown in FIG. 1 wherein both ends of the housing are open and the ends of the core remain open. Plate 44 is molded in place in the housing during this operation. The molding material is allowed to set to a hardened condition and during the molding operation, a pair of parallel ribs 72 are preferably formed in one flat side face 74 of housing 12, the face from which leads 66, 68 and 70 protrude. These ribs provide mounting feet for engaging a supporting surface.

Following the molding operation, the assembly of potentiometer 10 is continued by inserting lead screw 24 with slider 22 and wiper 20 thereon into housing 12 through the end corresponding to bearing member 26. Before this is done, however, bearing member 26 will be rigidly secured to shank 38 so that bearing member 26 will be rotatably received within the region defined by surface 25. Springs 36, 42 and 54 will have been placed on shanks 38 and 48 before the screw is inserted into place.

As the lead screw is inserted into the core, slider 22 will be received also without the core and shank 48 will be guided into place through opening 46 in plate 44. Spring 36 will engage face 40 of core 14 and thereby limit the inward travel of screw 24. At this stage of the assembly, shank 48 will extend through opening 46 and will project to the left of plate 44 when viewing FIG. 1. Retainer element 56 will then be inserted into housing 12 and forced onto the protruding end portion of shank 48 until base 58 engages plate 44. When this occurs, edges 62 of arms 60 will frictionally engage shank 48 and will hold the same against movement to the right when viewing FIG. 1. Screw 24 will be forced to the left sufficiently to cause spring 36 to exert a bias force to the right. This bias force will be sufficient to cause screw 24 to be properly mounted so that wiper 20 will properly engage the coil portions bridging the gap defined by slot 18. Plug 64 will then be put into place and the assembly of the potentiometer will then be complete.

The aforesaid construction of the components of potentiometer 10 and the way in which the same are assembled render the potentiometer capable of being inexpensively manufactured and quickly assembled so as to minimize production costs. The configuration of the components of potentiometer 10 does not require tedious and time-consuming steps for putting the components together. To this end, the components can be inserted into housing 12 from both ends to not only minimize the assembly time but avoid the requirement of special inner configurations for certain of the components, such as housing 12 and core 14, which were heretofore the reason why certain conventional potentiometers have had a relatively high unit cost.

Potentiometer 10 is used in the usual way by connecting leads 66, 68 and 70 to appropriate circuit elements for voltage dividing purposes or the like. The shapes of the various components can be such that potentiometer 10 can be miniaturized to render it applicable to a wide variety of circuits and environments. The mounting force screw 24 assures substantially complete reliability at all times and one which will stand extremes in operating conditions, including temperature, humidity and acceleration.

While one embodiment of this invention has been shown and described, it will be apparent that other adaptations and modifications can be made without departing from the true spirit and scope of the invention.

What is claimed is:

1. In a potentiometer: a tubular open end core having electrical resistance means wound thereon to define a coil having a number of turns; a tubular, open end housing mounted on said core in molded relationship to said resistance means and surrounding the latter; the molding material of the housing contacting said turns and extending at least partially into the spaces between adjacent turns; a screw disposed within and rotatable relative to the core; a bearing member rotatably engaging the inner surface of the housing at one end thereof, said screw being secured at one end thereof to said bearing member, whereby the latter is disposed to support the proximal end of the screw for rotation relative to the housing, said one end of the housing being of a size sufficient to permit insertion of said bearing member and said screw into said housing through said one end thereof; and means within the opposite end of the housing in engagement with the inner surface thereof and coupled to the other end of the screw for supporting the latter for rotation relative to said housing and for holding the latter against movement out of said one end of the housing, said supporting and holding means including an element movable into said housing through said opposite end thereof.

2. A potentiometer comprising: a tubular housing having a pair of open ends; a tubular, open end core provided with a longitudinally extending slot therein; a coil of wire wrapped on said core to present a number of turns and having portions extending across the slot, said housing being mounted in molded relationship on said coil and surrounding the same; the molding material of the housing contacting said turns and extending at least partially into the spaces between adjacent turns; a screw rotatably disposed within the core and receivable within said housing, said screw having a follower threadably mounted thereon for movement longitudinally of the core when the screw is rotated relative thereto; a wiper secured to the follower and normally disposed within said slot for engaging said coil portions; a first bearing member journaled in said one end of the housing exteriorly of the core and coupled to the proximal end of the screw for supporting the same, said housing being of a size at said one end sufficient to permit the screw and the first bearing member to be received within said one end and to permit said first bearing member to be rotatably engaged with said one end; a second bearing member disposed within the opposite end of the housing and coupled to the other end of the screw, said second bearing member being in engagement with said housing to support the screw, there being a stop engageable with said second bearing member and disposed to resist inward movement thereof to thereby hold the screw against movement out of the housing through said one end thereof, at least a portion of said second bearing member being movable into the housing through said opposite end thereof; and electrically conductive means coupled with the coil and the wiper for making electrical connections thereto.

3. A potentiometer as set forth in claim 2, wherein said second bearing member includes a retainer element having an extension engageable with the screw at a location to preclude movement of the same toward said one end of the housing.

4. A potentiometer as set forth in claim 2, wherein said second bearing member includes a supporting plate having an aperture for receiving said screw, and a retainer element coupled to said screw and slidably engaging said plate, said element having a central opening therethrough for receiving the screw and a number of spring projections extending toward the screw and away from said one end of the housing, said projections being in frictional engagement with the screw to thereby hold the latter against movement relative to said plate toward said one end of the housing.

5. A potentiometer as set forth in claim 2, wherein said follower, said screw and said second bearing member are electrically conductive, said lead means including a lead in electrical contact with the second bearing member.

References Cited

UNITED STATES PATENTS

| | | | |
|---|---|---|---|
| 2,870,303 | 1/1959 | O'Brian | 338—202 XR |
| 2,870,304 | 1/1959 | O'Brian | 338—180 XR |
| 2,886,681 | 5/1959 | Bourns et al. | 338—180 |
| 2,892,171 | 6/1959 | Semple | 338—180 |
| 3,069,648 | 12/1962 | Bourns et al. | 338—180 |
| 3,107,336 | 10/1963 | Caddock et al. | 338—180 |
| 3,135,941 | 6/1964 | Langenbach et al. | 338—180 |
| 3,179,910 | 4/1965 | Grunwald | 338—180 |
| 3,400,355 | 9/1968 | Benthuysen et al. | 338—183 |

THOMAS J. KOZMA, Primary Examiner

U.S. Cl. X.R.

338—184